UNITED STATES PATENT OFFICE.

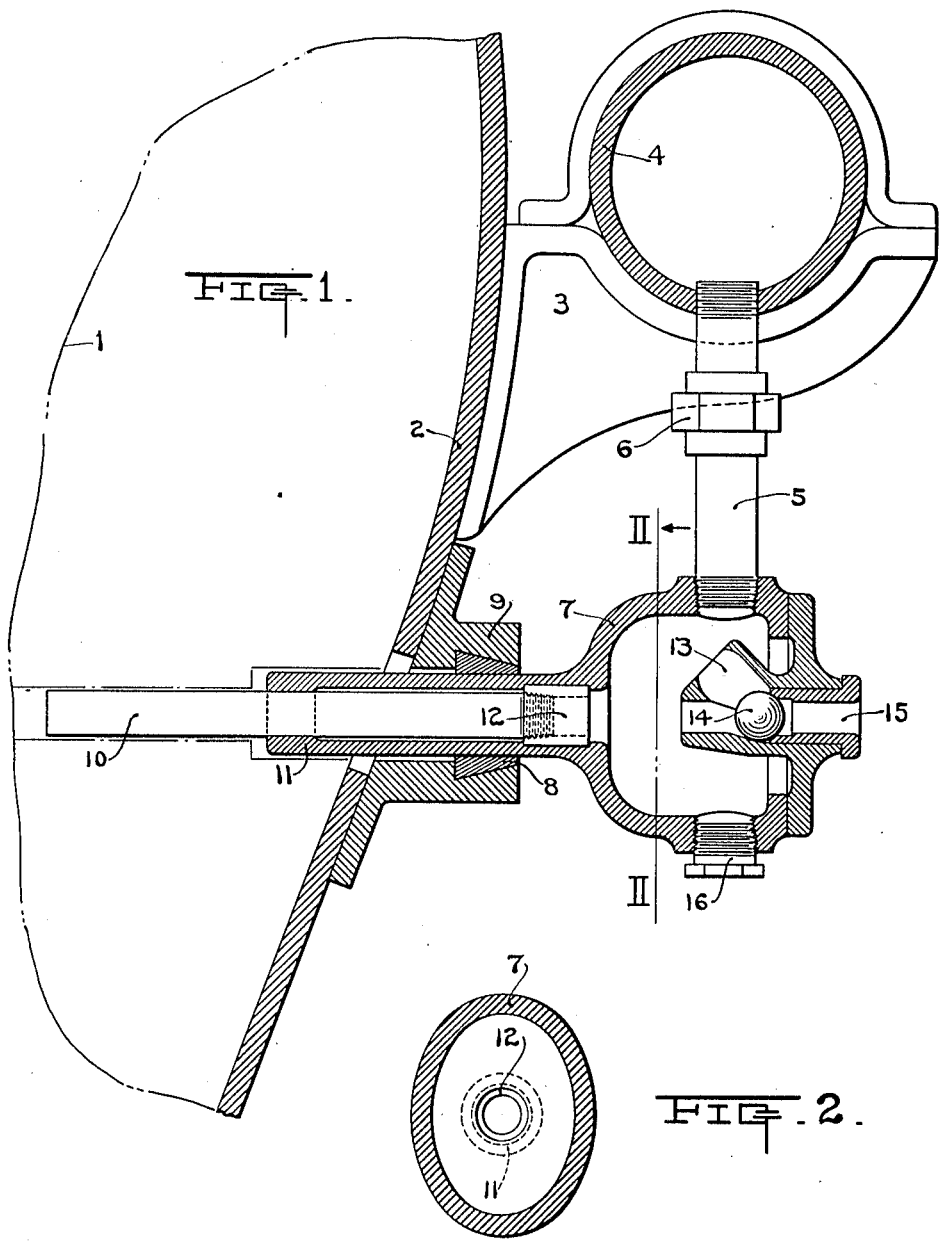

FORREST H. BLANDING, OF CHICAGO, ILLINOIS, ASSIGNOR TO ALLIS-CHALMERS COMPANY, OF MILWAUKEE, WISCONSIN, A CORPORATION OF NEW JERSEY.

CONVERTER-TWYER.

1,035,772.  Specification of Letters Patent.  Patented Aug. 13, 1912.

Application filed April 24, 1911. Serial No. 623,068.

*To all whom it may concern:*

Be it known that I, FORREST H. BLANDING, a citizen of the United States, residing at Chicago, in the county of Cook and State of Illinois, have invented a certain new and useful Improvement in Converter-Twyers, of which the following is a specification.

This invention relates to improvements in the construction of twyers for injecting air blasts into smelting furnaces and is especially applicable in copper converters.

The object of the invention is to provide a twyer or air injection pipe for copper converters which is simple in construction, efficient in operation, and easily repaired or replaced.

A clear conception of one embodiment of the invention can be obtained by referring to the accompanying drawing in which like reference characters designate the same or similar parts in the various views.

Figure 1 is a central, vertical section through a pipe and wind box of a copper converter showing these elements applied to a fragment of the converter shell. Fig. 2 is a transverse, vertical section through the wind box shown in Fig. 1, the section being taken along the line II—II of Fig. 1 looking in the direction of the arrow.

The copper converter, of which a fragment of the outer shell 2 is shown, is provided with a suitable lining 1 of non-combustible material. The air supply pipes 4, which extend along the sides of the converter parallel to the axis thereof, are supported by brackets 3 fastened to the shell 2. A series of vertically downwardly projecting pipes 5, having unions 6 therein, connect the pipes 4 with the wind boxes 7 and permit the passage of air from the pipes 4 to the interior of the wind boxes 7. The wind boxes 7 are arranged in series along the sides of the converter.

The outer end of each box 7 is inclosed by a cover having a poke hole 15 extending therethrough. The poke hole 15 is normally closed by the air pressure within the wind box 7 acting against a sphere 14 and pressing said sphere against a seat formed on the poke hole bushing. A recess 13 is formed in the cover and is of such a size as to permit the entrance of the sphere 14. The twyer end of the wind box 7 is provided with a sleeve 11 formed in one therewith and coaxial with the poke hole 15. A plug 16 incloses the lower portion of the wind box 7, being removable therefrom to permit inspection.

The pipe sleeve 12 is firmly fixed to the walls of the wind box sleeve 11. The twyer pipe 10 has screw-thread coaction with the pipe sleeve 12 and passes through the sleeve 11, extending toward the interior of the converter. The pipe 10 extends into an air injection hole formed in the lining 1 of the converter, but does not pass through the lining. The sleeve 11 passes through a stuffing box 9 fastened to the converter shell 2. Suitable packing 8 prevents the back flow of air from the interior of the converter to the atmosphere.

In casting the wind box, the interior of the sleeve 11 and wind box 7 are cored. The insertion of the pipe sleeve 12 is made by placing an internally threaded sleeve upon the core before insertion of same within the mold. The metal forming the body of the wind box 7 and sleeve 11 is then poured around the exterior of the core and in contact with the outer surface of the pipe sleeve 12, embedding the sleeve 11 in the wall of the wind box sleeve 11. As the casting cools, the pipe sleeve 12 is firmly fixed in position within the body of the wind box. After the core is removed from the interior of the wind box 7 and sleeve 11, the twyer pipe 10 can be screwed into place without necessitating further matching of the pipe sleeve 12, sleeve 11, or wind box 7.

It may be desirable to form small lugs on the exterior surface of the pipe sleeve 12 for the purpose of positively preventing turning of this sleeve within the sleeve 11. Such formation, however, is not essential since the cooling of the cast iron forming the body of the wind box causes same to shrink and firmly fixes the pipe sleeve 12 in place.

In operating the converter, the tilting thereof often causes slag to fall into the twyer pipes 10, it being necessary in such cases to force a rod through the poke holes 15 and through the interior of the pipe 10. Through successive passages of the rod through the pipe 10, this pipe is soon mutilated and must be replaced. Such replacing of the twyer pipe 10 is easily permitted by uncoupling the pipe 5 at the union 6, withdrawing the wind box 7 bodily from the sleeve 9, and unscrewing the twyer pipe 10 from the pipe sleeve 12.

It will be noted that with this construction, stuffing boxes at the outer end of the twyer pipes 10 are entirely avoided. The cost of construction is also greatly reduced, since no machining of the members is necessary after casting.

It should be understood that it is not desired to be limited to the exact details of construction shown and described, for obvious modifications will occur to a person skilled in the art.

It is claimed and desired to secure by Letters Patent,—

1. In a converter twyer, a wind box, a sleeve projecting from said wind box and connecting with the converter, a second sleeve fixed within said first sleeve, and a pipe fixed to said second sleeve, said pipe being removable from said sleeve.

2. In a converter twyer, a wind box, a sleeve projecting from said wind box and connecting with the converter, a second sleeve embedded in said first sleeve, and a pipe removably attached to said second sleeve.

3. In a converter twyer, a wind box, a sleeve projecting from said wind box and connecting with the converter, a second sleeve embedded in said first sleeve, and a pipe removably attached to said second sleeve, said pipe passing through said first sleeve.

In testimony whereof, I affix my signature in the presence of two witnesses.

FORREST H. BLANDING.

Witnesses:
JOHN F. WILLIAMS,
JAMES P. DUGUID.

Copies of this patent may be obtained for five cents each, by addressing the "Commissioner of Patents, Washington, D. C."